May 10, 1938.    T. E. FOULKE    2,116,678
ELECTRIC GASEOUS DISCHARGE DEVICE
Original Filed April 9, 1936
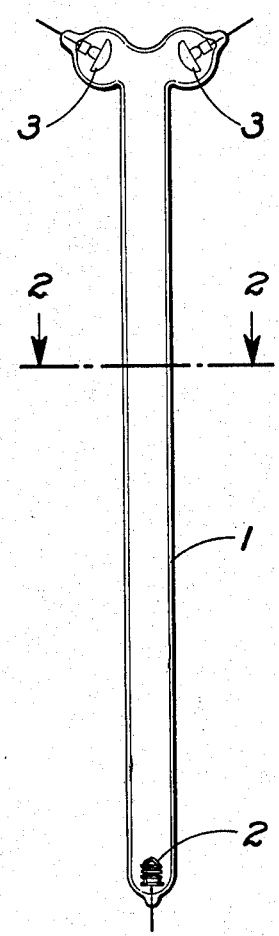
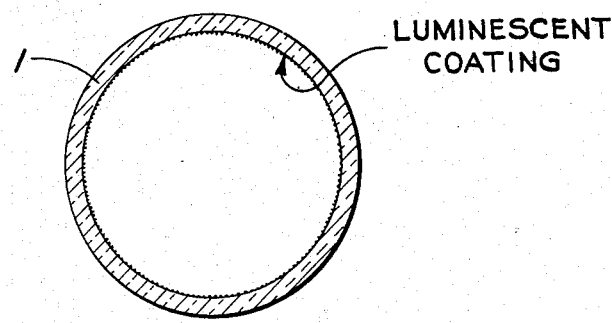
INVENTOR
Ted E. Foulke
BY
ATTORNEY Patented May 10, 1938

2,116,678

UNITED STATES PATENT OFFICE 2,116,678

ELECTRIC GASEOUS DISCHARGE DEVICE

Ted E. Foulke, Nutley, N. J., assignor to General Electric Vapor Lamp Company, Hoboken, N. J., a corporation of New Jersey Original application April 9, 1936, Serial No. 73,533. Divided and this application January 14, 1937, Serial No. 120,543

3 Claims. (Cl. 176—122)

The present invention relates to electric lamps containing a novel fluorescent material as a light source.

A particular object of the invention is to provide a gaseous discharge device having an internal coating of a novel fluorescent material to complement or modify the light emitted thereby. Another object of my invention is to provide a light source of this type which will have a high efficiency throughout a long useful life. Still other objects and advantages of the invention will appear from the following detailed specification.

The invention consists in the novel gaseous discharge device hereinafter set forth and claimed.

In the artificial preparation of luminescent substances it has long been known that the best results were obtained by bringing the main luminescent substance into intimate contact with a small amount of another material which serves as an exciting agent, usually in the form of a solid solution, and that this result was materially aided through the use of a flux, such as sodium carbonate. While many well known luminescent mixtures have been produced by this method, all prior efforts to produce an effective luminescent material containing cadmium silicate according to this procedure have failed, the luminescence of the product thus produced being so weak and inefficient that the product was valueless for any practical purpose. This has been true of all cases where ordinary so-called chemically pure cadmium oxide, silica, manganese dioxide and any of the usual sodium, barium, strontium or calcium fluxes have been sintered together, in accordance with the common practice, to produce a luminescent compound. As a result no hope has been entertained of being able to use cadmium silicate as a source of luminescent light, in spite of the desirable red color of the light emitted thereby.

I have now discovered that this failure to produce a luminescent product of practical value has been due to the presence of minute quantities of nickel, iron, cobalt, copper, lead or the like in the compounds used, and that these traces of foreign elements have been responsible for the virtual elimination of the luminescence of the resulting product. Consequently the fundamental step of my novel method is a complete elimination of all of these undesired metals from the product, either by the initial purification of the materials employed, or by removal during the heating incident to the production of the final product. The purification of the materials themselves is, of course, a tedious and expensive process, so that the latter method is to be preferred, especially since I have now discovered that the presence of potassium in the mixture which is calcined to produce the luminous material results in the complete elimination of these undesired metals, or at least of their undesired effects. At the same time this potassium serves as a flux which very materially speeds up the desired production of a solid solution of the active fluorescent elements, with the result that with this novel method a highly efficient luminescent product is formed within a few minutes or even seconds, as contrasted with the hours or days which would otherwise be required. It is thus apparent that the potassium or potassium compounds employed have a dual function not possessed by any of the fluxes heretofore used, and that the potassium thus produces a result which is unattainable with any of these other fluxes.

I have furthermore discovered that the ratio of the various elements employed is critical and that the desired result is not produced unless the potassium is kept within certain narrow limits. Thus I have found that first of all the ratio of the cadmium oxide to the silicic acid which is commonly employed should equal $.8 \pm .1$, since there is a rapid decrease in the luminescent effect with variations on either side of this value. While this is substantially the molecular ratio required to produce the cadmium silicate $CdSi_2O_5$ it is not certain that this compound is necessarily produced, since it is possible that a solid solution of $CdO.2SiO_2$ is formed. Secondly, the maximum luminescent effect is produced when the manganese dioxide, silver, or other exciting agent and the potassium used together constitute a critical percentage of the total mixture. For example, where manganese dioxide and potassium chloride are used, the total percentage of these compounds for maximum brightness of the luminescent material should be approximately 3%, the luminescence obtainable falling off to less than a half when this percentage is decreased to 2% or increased to 4%, and peaking sharply at 3.1%. Thirdly, the ratio of the potassium chloride to the manganese dioxide is critical and should be approximately 2 for best results. These ratios and percentages, all by weight, are for the particular compounds mentioned, it being understood that where other compounds of manganese and potassium are employed these figures are varied to keep the proportions of the metals themselves constant, that is, for best results the potassium should be approximately 2.1% of the cadmium oxide, by weight, while the manganese is approximately 1.25% of the cadmium oxide.

The presence of potassium in the resulting product has been found to be very beneficial in that it produces a crystalline substance which is easily pulverized to produce any desired crystal size, such as desired for the coating of the inner surface of mercury vapor arc lamps and other similar devices. While this pulverization results in a substantial loss in the luminescent effect, as is well known, I have discovered that by heating the crystals to a temperature just below that at which they will again sinter together their luminescent property is restored to the maximum value. Thus this novel process results in the production of a powder of any desired fineness and having highly efficient luminescent properties. In passing it may be noted that this novel process of restoring the luminescent property to powdered material has been found to be effective with all of these luminescent compounds, regardless of the flux used.

The presence of the potassium in my novel luminescent material has also been found to greatly enhance the stability of the product as compared to that which is attainable in any other way, it having been observed that a coating of this material used within a mercury vapor arc lamp is unaffected either by the discharge or by the mercury vapor and hence depreciates in luminous efficiency at an extremely low rate.

For the purpose of illustrating my invention I have shown a novel lamp having my new coating on the inner surface thereof in the accompanying drawing, in which Fig. 1 is an elevational view of a lamp having a preferred form, and Fig. 2 is a sectional view of the lamp tube showing the coating.

The following preferred procedure is illustrative of my invention. Thus according to this novel process cadmium oxide and silica or silicic acid are first intimately mixed together as in a ball mill in the proportions of CdO to silica of $.8 \pm .1$. A potassium carbonate solution is then added to this mixture and stirred to form a thin paste, after which manganese chloride is added and stirred, the proportions being such that the potassium is substantially 2.1% of the cadmium oxide and the manganese approximately 1.25% of the cadmium oxide, by weight. At this stage the manganese chloride and potassium carbonate interact to produce manganese carbonate (which loses $CO_2$ upon heating) and potassium chloride, this particular method of introducing these compounds having been found to give an exceptionally good distribution of these compounds throughout the mass. The mixture is then dried and stirred to further mix it, after which it is heated in air to a temperature of the order of 1100° C. for approximately five minutes or until the fuming stops. During this heating the potassium chloride unites with any traces of the oxides of lead, nickel, iron, cobalt, copper or the like, all of which have been found to be undesirable, to form chlorides of these metals and potassium oxide, all of which are volatilized at or below this temperature, thus accounting for the fuming during this heating. At the same time the remaining major proportion of the potassium chloride fuses and serves as a flux which causes the cadmium, the silicon and the manganese compounds to rapidly go into the desired solid solution.

After cooling the resulting fritted mass is pulverized to the size desired and then again reheated for several minutes in the crucible to a temperature of the order of 1050° C., this being just below the sintering point of the mass, and then cooled, the resulting powder being ready for use and having an extremely high luminescent efficiency.

In some cases several intermediate heatings in the crucible may be added to the above, each heating being at a slightly lower temperature than the one previous thereto, with pulverization following each heating, slightly improved results being obtained in some cases by these added steps, especially where the initial mixing of the various components of the product has not been entirely thorough.

The resulting powder is then affixed to the inner surface of the arc tube 1 of the lamp shown in Figs. 1 and 2. As there shown this lamp, which is of the order of 1 inch in diameter and some fifty inches long, has a cathode 2 at one end thereof, and a pair of anodes 3 in separate chambers at the opposite end thereof in accordance with conventional practice where rectifying operation on alternating current is desired, although it is to be understood that by using a similar cathode 2 in place of the anodes 3 the tube could also be made to operate with a reversing discharge on alternating current. Likewise the device may be operated on direct current with a single anode. Said cathode is illustrated as of the type disclosed in U. S. Patent 2,009,211, granted July 23, 1935 to James A. St. Louis, but it is to be understood that any of the well known types of cold cathode, such as now used in signs and the like, or hot cathode such as the Pirani or Hull cathodes, for example, are used in place thereof where desired. The anodes are preferably of graphite, or any other suitable material. This lamp may contain any suitable gaseous atmosphere, but I prefer to use argon and mercury, since a discharge in this particular mixture produces slow electrons and radiations, such as the 2537 A. line, which are extremely effective in exciting the luminescent cadmium silicate and likewise produces visible radiations which are complementary to the red of the cadmium silicate, whereby the resultant light emitted by the lamp closely approximates daylight. The argon is usually introduced at a pressure of the order of 2 or 3 m. m. of mercury, while the mercury is preferably restricted to an amount slightly in excess of that which is vaporized at the normal operating temperature, in order to prevent excess deposits of mercury along the tube in operation. Where a mercury containing appendix is employed, however, more mercury is sometimes employed. The luminescent coating is affixed to the inner surface of the tube 1 substantially all the way from the cathode 2 to the anodes 3 either by means of a lower melting point glass, as disclosed by Wilford J. Winninghoff in his pending application, Serial No. 511,409, filed Jan. 26, 1931, or by the use of a boric oxide glaze such as described by Eugene Lemmers et al. in their pending application, Serial No. 741,144, filed August 23, 1934, or in any other suitable manner.

When such a lamp is operated with a one ampere discharge with inductive ballast in a conventional rectifying circuit the arc drop is approximately 88 volts and the total input 100 watts. Under these conditions the tube itself has a luminous efficiency of better than 35 lumens per watt, while the over-all efficiency is more than 30 lumens per watt. With lower currents this efficiency is still further increased. I have found that my novel coating, due to its unique character, is unaffected by the discharge under these conditions, so that the light output varies but little with age, the device thus having a useful life of many thousand hours.

While I have described my invention by reference to a process wherein the potassium and manganese are added as separate compounds it is to be understood that in some cases they may be added in a single compound, as by the use of potassium permanganate. It is likewise to be understood that other compounds of potassium and of manganese can be employed, and that various other changes, substitutions and omissions, within the scope of the appended claims may likewise be made by those skilled in the art in the steps of the method or in the product without departing from the spirit of my invention.

This is a division of my co-pending application, Serial Number 73,533, filed April 9, 1936.

I claim as my invention:

1. An electric gaseous discharge device comprising a sealed envelope containing a gaseous atmosphere and having electrodes sealed therein, a coating of luminescent cadmium silicate on the inner wall of said envelope and extending along the discharge path between said electrodes, said coating containing a flux of a potassium compound.

2. An electric gaseous discharge device comprising a sealed envelope containing mercury and having electrodes sealed therein, a coating of luminescent cadmium silicate on the inner wall of said envelope and extending along the discharge path between said electrodes, said coating containing a small percentage of a potassium compound which serves as a flux.

3. An electric gaseous discharge device comprising a sealed envelope containing mercury and having electrodes sealed therein, and a coating of a luminescent material on the inner wall of said envelope and extending along the discharge path between said electrodes, said coating consisting of cadmium oxide and silicon dioxide in the proportions indicated by the formula $CdSi_2O_5$ having intermixed therewith manganese and potassium compounds which serve as activator and flux, respectively, of the resulting luminescent material, the manganese and potassium, in terms of the metal content of these compounds, being of the order of 1.25% and 2.1%, respectively, of the cadmium oxide content of the luminescent material.

TED E. FOULKE.